United States Patent [19]

Carney et al.

[11] 3,789,123

[45] Jan. 29, 1974

[54] TERTIARY AMINOACIDS AS ANTI-INFLAMMATORY AGENTS

[75] Inventors: Richard William James Carney, New Providence; George De Stevens, Summit, both of N.J.

[73] Assignee: Ciba-Geigy Corporation, Ardsley, N.Y.

[22] Filed: Jan. 21, 1969

[21] Appl. No.: 792,755

Related U.S. Application Data

[63] Continuation-in-part of Ser. No. 757,136, Sept. 3, 1968, Pat. No. 3,657,230, which is a continuation-in-part of Ser. No. 716,347, March 27, 1968, abandoned.

[52] U.S. Cl................. 424/310, 424/248, 424/267, 424/224, 421/317
[51] Int. Cl. ........................................... H61k 27/00
[58] Field of Search.................... 424/310, 317, 319

[56] References Cited
UNITED STATES PATENTS
3,657,230  4/1972  Carney et al. .................... 424/274

FOREIGN PATENTS OR APPLICATIONS
42,447  6/1966  France ................................. 424/319

Primary Examiner—Jerome D. Goldberg
Attorney, Agent, or Firm—Harry Goldsmith; Joseph G. Kolodny; Bryant W. Brennan

[57]  ABSTRACT

New α-(tert. arylaminophenyl)-aliphatic acids, e.g. those of the formula

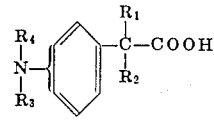

$R_1$ = H or alkyl
$R_2$ = H, alk(en)yl, cycloalk(en)yl or cycloalk(en)yl-alkyl
$R_3$ = alk(en)yl, hydroxyalkyl, alkoxyalkyl, aminoalkyl, cycloalk(en)yl or cycloalk(en)yl-alkyl
$R_4$ = aryl and functional derivatives thereof, are anti-inflammatory agents.

2 Claims, No Drawings

TERTIARY AMINOACIDS AS ANTI-INFLAMMATORY AGENTS

CROSS-REFERENCES TO RELATED APPLICATIONS

This is a continuation-in-part of application Ser. No. 757,136, filed Sept. 3, 1968 (now U.S. Pat. No. 3,657,230), which in turn is a continuation-in-part of application Ser. No. 716,347, filed Mar. 27, 1968 (now abandoned).

SUMMARY OF THE INVENTION

The present invention concerns and has for its object the provision of a new α-(tert. arylaminophenyl)-aliphatic acids of the Formula I

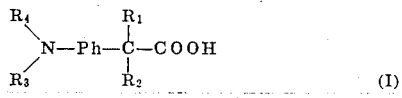
(I)

in which $R_1$ is hydrogen or lower alkyl, $R_2$ is hydrogen, lower alkyl, alkenyl, cycloalkyl, cycloalkenyl, cycloalkyl-alkyl or cycloalkenyl-alkyl, Ph is a 1,3- or 1,4-phenylene radical, $R_3$ is lower alkyl, alkenyl, hydroxyalkyl, alkoxyalkyl, aminoalkyl, cycloalkyl, cycloalkenyl, cycloalkyl-alkyl or cycloalkenyl-alkyl, in which the heteroatoms are separated from the nitrogen atom by at least two carbon atoms, and $R_4$ is an aryl radical, of the functional acid or amino derivatives thereof, as well as of corresponding pharmaceutical compositions and of methods for the preparation and application of these products. Said compositions are useful anti-inflammatory agents in the treatment or management of arthritic and dermatopathologic conditions.

DESCRIPTION OF THE PREFERRED EMBODIMENT

The lower alkyl radicals $R_1$ to $R_3$ represent, for example, methyl, ethyl, n- or i-propyl, -butyl, -pentyl, -hexyl or -heptyl. A lower alkenyl radical $R_2$ or $R_3$ is, for example, vinyl, allyl, methallyl, 3-butenyl or 1-pentenyl. The term "lower," referred to above and hereinafter in connection with organic radicals or compounds respectively, defines such with up to seven, preferably up to four, carbon atoms.

A lower alkoxy-lower alkyl radical $R_3$ is, for example, 2-(methoxy, ethoxy, n- or i-propoxy)-ethyl or -propyl, 3-(methoxy or ethoxy)-propyl or 4-methoxybutyl. An aminoalkyl group $R_3$ is, for example, (amino, mono- or di-lower alkylamino, lower alkyleneimino or monoaza-, monooxa- or monothia-lower alkyleneimino)-lower alkyl, e.g. ω-(amino, ethylamino, dimethylamino, pyrrolidino, piperidino, piperazino, 4-methylpiperazino, morpholino or thiamorpholino)-ethyl, -propyl or -butyl.

A cycloalkyl or cycloalkenyl radical $R_2$ or $R_3$ is preferably three to seven ring-membered and unsubstituted or substituted by up to four lower alkyls, such as cyclopropyl, 1- or 2-methyl-cyclopropyl, 1,2-, 2,2- or 2,3-dimethyl-cyclopropyl, 1,2,2- or 1,2,3- trimethyl-cyclopropyl or 2,2,3,3-tetramethyl-cyclopropyl, cyclobutyl, 3,3-dimethyl-cyclobutyl, or 2,2,3-trimethyl-cyclobutyl, cyclopentyl, 2-or 3-methyl-cyclopentyl, 2,5- or 3,4-dimethyl-cyclopentyl, cyclo-hexyl, 2-, 3- or 4-methyl-cyclohexyl, 2,3-, 2,4- or 3,5-dimethyl-cyclohexyl or 2,4,6-trimethyl-cyclohexyl or cycloheptyl; 2-cyclopropenyl, 2,3-dimethyl-2-cyclopropenyl, 1-, 2- or 3-cyclopentenyl or -cyclohexenyl, 2- or 3-methyl-2-cyclopentenyl, 3,4-dimethyl-3-cyclopentenyl or 2-, 3- or 4-methyl-1 or 2-cyclohexenyl. A cycloalkyl-lower alkyl or cycloalkenyl-lower alkyl radical $R_2$ or $R_3$ is one of the above-mentioned lower alkyl groups, preferably such with up to four carbon atoms, having in any position thereof, preferably at the terminal carbon atom, one of said cycloalkyl or cycloalkenyl radicals attached, e.g. cyclopropylmethyl, 2-cyclopentylethyl or 3-cyclopentenylmethyl.

The phenylene radical Ph, carrying the tertiary amino group

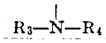

in the three- or preferably four-position, is unsubstituted or substituted in the remaining positions by one or more than one, preferably one or two, of the same or different suitable substituents selected, for example, from lower alkyl, e.g. methyl, ethyl, n- or i-propyl or -butyl, free etherified or esterified hydroxy or mercapto, such as lower alkoxy or lower alkylmercapto, e.g. methoxy, ethoxy, n- or i-propoxy or -butoxy, methylmercapto or ethylmercapto, halogeno, e.g. fluoro, chloro or bromo, trifluoromethyl, nitro, amino, di-lower alkylamino or lower alkanoylamino, e.g. dimethylamino, N-methyl-N-ethylamino, diethylamino, di-n- or i-propylamino or -butylamino; acetylamino or pivaloylamino, furthermore cyano, carbamoyl, di-lower alkylcarbamoyl, carboxy, lower alkylsulfonyl, sulfo, sulfamoyl or di-lower alkylsulfamoyl, e.g. N,N-dimethylcarbamoyl or -sulfamoyl, methyl- or ethylsulfonyl. More particularly, the phenylene radical Ph represents especially 1,3- or 1,4-phenylene, but also (lower alkyl)-1,3- or 1,4-phenylene, (lower alkoxy)-1,3- or 1,4-phenylene, (halogeno)-1,3- or 1,4-phenylene, (trifluoromethyl)-1,3- or 1,4-phenylene, (amino)-1,3- or 1,4-phenylene or (di-lower alkylamino)-1,3- or 1,4-phenylene.

The aryl radical $R_4$ is preferably a monocyclic iso- or heterocyclic aryl radical, such as an unsubstituted or substituted phenyl, pyridyl, furyl or thiophenyl radical wherein the substituents are those shown above for Ph. A preferred aryl radical $R_4$ is the HPh moiety, especially phenyl, (lower alkyl)-phenyl, (lower alkoxy)-phenyl, (halogeno)-phenyl, (trifluoromethyl)-phenyl, (amino)-phenyl or (di-lower alkylamino)-phenyl.

In view of the above, the tertiary amino group

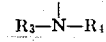

represents, for example, N-(lower alkyl, lower alkenyl, lower hydroxyalkyl, lower alkoxy-lower alkyl, amino-lower alkyl, mono- or di-lower alkylamino-lower alkyl, lower alkyleneimino-lower alkyl, monoaza-,-oxa- or -thia-lower alkyleneimino-lower alkyl, three to seven-ring-membered cycloalkyl, cycloalkenyl, cycloalkyl-lower alkyl or cycloalkenyl-lower alkyl)-N-HPh-amino, e.g. N-(methyl, ethyl, n- or i-propyl, allyl, methallyl, 3-butenyl, 2-hydroxyethyl, 2-methoxyethyl, 3-aminopropyl, 2-ethylaminoethyl, 3-dimethylaminopropyl, 2-pyrrolidinoethyl, 2-piperazinoethyl, 2-morpholinoethyl, cyclopropyl, cyclopentyl, cyclohexyl, 3-cyclopentenyl, 2-cyclohexenyl, cyclopropyl-methyl, 2-cyclopentylethyl or 3-cyclopentenylmethyl)-N-(phenyl, tolyl, anisyl, chlorophenyl, trifluoromethyl-phenyl, aminophenyl or dimethylaminophenyl)-amino.

Functional derivatives of the acids of Formula I are preferably their esters, for example, their lower alkyl, lower alkenyl, three to seven ring-membered cycloalkyl, cycloalkenyl, cycloalkyl-lower alkyl or cycloalkenyl-lower alkyl, aryl or aralkyl esters, e.g. the HPh or HPh-lower alkyl esters, free or etherified hydroxy-lower alkyl, e.g. lower alkoxy- or three to seven ring-membered cyclo-alkoxy-lower alkyl or acyclic or cyclic tert. amino-lower alkyl esters, wherein the tertiary amino group represents, for example, di-lower alkylamino or lower alkyleneimino, e.g. dimethylamino, diethylamino, pyrrolidino or piperidino, or monoaza-, monooxa- or monothia-lower alkyleneimino, such as piperazino, 4-lower alkyl-piperazino, e.g. 4-(methyl or ethyl)-piperazino, morpholino or thiamorpholino. Other functional derivatives of the acids of Formula I are, for example, unsubstituted or substituted amides or thioamides, e.g. mono- or di-lower alkylamides, HPh-amides, HPh-lower alkylamides, monocyclic lower alkyleneamides, monoaza-, monooxa- or monothia-lower alkyleneamides, furthermore the corresponding thioamides, hydroxamic acids, nitriles, ammonium or metal salts. Amino derivatives are the N-oxide, lower alkyl- or HPh-lower alkyl quaternaries and acid addition salts.

The compounds of the invention possess valuable pharmacological properties. For example, they exhibit anti-inflammatory effects, as can be demonstrated in animal tests, using advantageously mammals, such as rats, as test objects. Such tests can be performed, for example, according to Winter et al. Proc. Soc. Exp. Biol. & Med. 111, 544 (1962). According to it, the compounds of the invention are applied, in the form of aqueous solutions or suspensions, by stomach tube to male and female mature rats, in the dosage range between about 0.1 and 75 mg/kg/day, preferably between about 0.5 and 50 mg/kg/day, advantageously between about 1 and 25 mg/kg/day. About 1 hour later 0.06 ml of a 1 percent aqueous suspension of carrageenin is injected into the rat's left hind paw and 3 hours subsequently any anti-inflammatory activity can be expressed by the difference of the volume and/or weight of the edematous left paw and that of the right paw, as compared with said difference estimated from untreated control animals. Accordingly, the compounds of the invention are useful anti-inflammatory agents in the treatment or management of arthritic and dermatopathologic conditions, but also useful intermediates in the preparation of other valuable products, preferably of pharmacologically active compounds.

Preferred compounds of the invention are those of Formula I in which $R_1$ is hydrogen or lower alkyl, $R_2$ is hydrogen, lower alkyl, lower alkenyl or three to seven ring-membered cycloalkyl, cycloalkenyl, cycloalkyl-lower alkyl or cycloalkenyl-lower alkyl, Ph is unsubstituted 1,3- or 1,4-phenylene or such phenylene substituted by one or two members selected from the group consisting of lower alkyl, hydroxy, mercapto, lower alkoxy, lower alkylmercapto, halogeno, trifluoromethyl, nitro, amino, di-lower alkylamino, lower alkanoylamino, cyano, carbamoyl, di-lower alkylcarbamoyl, carboxy, lower alkylsulfonyl, sulfo, sulfamoyl or di-lower alkyl-sulfamoyl, $R_3$ is lower alkyl, lower alkenyl, hydroxylower alkyl, lower alkoxy-lower alkyl, amino-lower alkyl, mono-or di-lower alkylamino-lower alkyl, lower alkyleneimino-lower alkyl, monoaza-, -oxa-, or -thia- lower alkyleneimino-lower alkyl, 3 to 7-ring-membered cycloalkyl, cycloalkenyl, cycloalkyl-lower alkyl or cycloalkenyl-lower alkyl, and $R_4$ is unsubstituted phenyl or phenyl substituted by one or two members selected from the group consisting of lower alkyl, hydroxy, mercapto, lower alkoxy, lower alkylmercapto, halogeno, trifluoromethyl, nitro, amino, di-lower alkylamino, lower alkanoyl-amino, cyano, carbamoyl, di-lower alkyl-carbamoyl, carboxy, lower alkylsulfonyl, sulfo, sulfamoyl or di-lower alkyl-sulfamoyl, as well as a lower alkyl ester, lower alkenyl ester, three to seven ring-membered cycloalkyl ester, cycloalkenyl ester, cycloalkyl-lower alkyl ester, cycloalkenyl-lower alkyl ester, HPh-ester, HPh-lower alkyl ester, hydroxy-lower alkyl ester, lower alkoxy-lower alkyl ester, di-lower alkylamino-lower alkyl ester, lower alkyleneimino-lower alkyl ester or monoaza-, monooxa-or monothia-lower alkyleneimino-lower alkyl ester thereof, wherein two hetero atoms are separated from each other by at least two carbon atoms, the amide, thioamide, a mono- or di-lower alkylamide, mono- or di-lower alkylthiomide, lower alkyleneamide, lower alkylene-thioamide, HPh-amide, HPh-thioamide, HPh-lower alkylamide, HPh-lower alkyl-thioamide, morpholide, thiamorpholide or hydroxamic acid thereof, the N-oxide, a lower alkyl quaternary, HPh-lower alkyl quaternary or a therapeutically useful salt of these compounds.

Particularly useful are the compounds of Formula I, in which $R_1$ is hydrogen or lower alkyl, $R_2$ is hydrogen, lower alkyl, three- to seven- ring-membered cycloalkyl or mono- or di-(lower alkyl)-cycloalkyl, Ph is 1,3- or 1,4-phenylene, (lower alkyl)-1,3- or 1,4-phenylene, (lower alkoxy)-1,3- or 1,4-phenylene, (halogeno)-1,3- or 1,4-phenylene, (trifluoromethyl)-1,3- or 1,4-phenylene or (di-lower alkylamino)-1,3- or 1,4-phenylene, $R_3$ is lower alkyl, lower alkenyl, hydroxy-lower alkyl or lower alkoxy-lower alkyl and $R_4$ is phenyl, (lower alkyl)-phenyl, (lower alkoxy)-phenyl, (halogeno)-phenyl, (trifluoromethyl)-phenyl, (amino)-phenyl or (di-lower alkylamino)-phenyl, a lower alkyl ester, the amide, a mono- or di-lower alkylamide, the ammonium salt, an alkali metal or alkaline earth metal salt or a therapeutically useful acid addition salt of these compounds.

Preferred compounds of the invention are those of Formula II

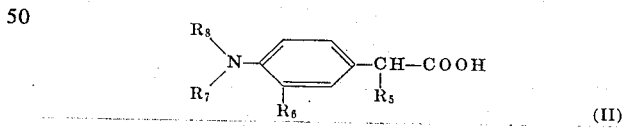

(II)

in which $R_5$ is hydrogen, lower alkyl or unsubstituted three to six ring-membered cycloalkyl, $R_6$ is hydrogen, lower alkyl, lower alkoxy, halogeno or trifluoromethyl, $R_7$ is lower alkyl and $R_8$ is phenyl, (lower alkyl)-phenyl, (lower alkoxy)-phenyl, (halogeno)-phenyl, (trifluoromethyl)-phenyl, (amino)-phenyl or (di-lower alkylamino)-phenyl, a lower alkyl ester, the ammonium salt, an alkali metal salt or a therapeutically useful acid addition salt thereof.

Especially valuable are compounds of the Formula II, in which $R_5$ is hydrogen, methyl, ethyl or cyclopropyl, $R_6$ is hydrogen or chloro, $R_7$ is methyl or ethyl and $R_8$ is phenyl, tolyl, anisyl or chlorophenyl, or the methyl or ethyl ester, the ammonium salt, an alkali metal salt or a therapeutically useful acid addition salt thereof.

The compounds of this invention are prepared according to methods known per se. For example, they are obtained by:

a. converting in a compound of the formula

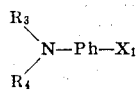

in which $X_1$ is a substituent capable of being converted into the free or functionally converted

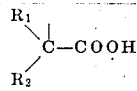

moiety, $X_1$ into said moiety or b. converting in a compound of the formula

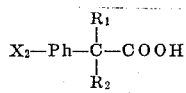

or a functional derivative thereof, in which $X_2$ is a substituent capable of being converted into

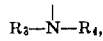

$X_2$ into said tertiary phenylamino group and, if desired, converting any resulting compound into another compound of the invention.

The substituent $X_1$ is, for example, the group

in which Y is an alkali metal, e.g. lithium, halomagnesium or reactively etherified or esterified hydroxy, for example, that derived from a lower alkanol or a strong mineral acid respectively, particularly an ester of a hydrohalic acid, e.g. hydrochloric or hydrobromic acid, a sulfuric or sulfonic acid, such as a lower alkane or benzene sulfonic acid, e.g. methane, ethane or p-toluene sulfonic acid. Such a starting material is reacted with a reactive derivative of carbonic or formic acid, whereby both reactants at most contain one metal atom. The metal or Grignard compound can be reacted with any suitable, metal free carbonic or formic acid derivative, advantageously carbon dioxide or disulfide, but also a carbonate or haloformate, e.g. diethyl carbonate or thiocarbonate, ethyl, tert. butyl, allyl, 2-methoxyethyl, 3-chloropropyl, phenyl or benzyl chloroformate, cyanogen or carbamoyl halides, e.g. cyanogen bromide or N,N-diethyl-carbamoyl chloride. The reactive esterified hydroxycompound is advantageously reacted with a metal cyanide.

Another substituent $X_1$ is, for example the group

acetyl, halocarbonyl or 1-lower alkenyl, wherein Z is an ammonium group or a hydroxy- or boryl-methyl, formyl, 1-lower alkenyl, lower alkenoyl or carboxycarbonyl group. In the first mentioned starting materials Z is converted into carboxy according to standard replacement, oxidation or decarbonylation methods. An ammonium group Z, e.g. trimethylammonium, can be replaced, for example, by cyano, upon reacting said starting material with a metal cyanide, e.g. potassium cyanide. The other Z groups can be converted into carboxy, for example, with the use of hydrogen peroxide, heavy metal salts or oxides, e.g. alkali metal chromates or permanganates, chromic or cupric salts, e.g. halides or sulfates, mercuric, manganese or silver oxide, in acidic or alkaline media respectively. Decarbonylation of the carboxycarbonyl compounds is preferably carried out by pyrolysis, advantageously in the presence of copper powder. In case $X_1$ is acetyl, said group can be oxidized, for example, according to Willgerodt-Kindler with the use of sulfur in the presence of ammonia, primary or secondary amines. In case $X_1$ is halocarbonyl, the starting material is treated according to Arndt-Eistert with a corresponding aliphatic ($R_2$) diazo compound and the diazoketones formed are rearranged by hydrolysis, alcoholysis, ammonolysis or aminolysis. In case $X_1$ is 1-lower alkenyl, such starting material can be reacted with carbon monoxide and water under acidic conditions, for example, in the presence of sulfuric acid.

$X_1$ may also be the free or functionally converted

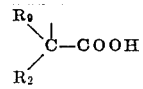

or

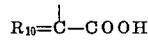

groups, in which $R_9$ is hydroxy or carboxy and $R_{10}$ is lower alkylidene or cycloalkylidene, which are reduced or decarboxylated according to standard methods, advantageously reduced with the use of catalytically activated or nascent hydrogen, e.g. hydrogen in the presence of nickel, palladium or platinum catalysts, the $\alpha$-hydroxy-acids also with phosphorus and iodine, hydriodic acid or stannous chloride, and decarboxylated by pyrolysis, advantageously in acidic media.

Finally, $X_1$ may be hydrogen or a metal atom or group respectively, e.g. lithium or halomagnesium. These starting materials can be reacted with a reactive ester of a corresponding functional glycolic acid derivative, e.g. the compound of the formula

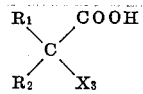

or a functional derivative, e.g. ester, amide or nitrile thereof, wherein $X_3$ is reactively esterified hydroxy, such as halogeno or sulfonyloxy, e.g. bromo, benzenesulfonyloxy or tosyloxy, whereby the reaction with the starting material, wherein $X_1$ is hydrogen, is performed in the presence of a Lewis acid, e.g. aluminum chloride.

The substituent $X_2$ is, for example, reactively esterified hydroxy, e.g. halogen advantageously fluorine, which is replaced by the tert. amino group

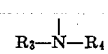

by reacting the corresponding starting material with the secondary amines

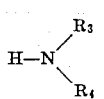

or their alkali metal derivatives.

$X_2$ may also be primary or secondary amino, which is further substituted with the use of corresponding reactively esterified alcohols, such as lower alkyl, cycloalkyl or aralkyl halides. It may also be substituted by reductive alkylation, i.e. reaction with aliphatic or araliphatic aldehydes or ketones in the presence of reducing agents, e.g. formic acid or its functional derivatives, or catalytically activated hydrogen. Moreover, $X_2$ may be a corresponding acylamino group, i.e. such in which $R_3$ contains an oxo group attached to the carbon atom bound to the amino-nitrogen atom. Such acylamino group can be coverted into

by reduction, e.g. with the use of selective reducing agents, such as boron hydride, diborane or their equivalents.

The compounds of the invention so obtained can be converted into each other according to methods known per se. For example, resulting free acids may be esterified with the corresponding alcohols in the presence of a strong acid, e.g. hydrochloric, sulfuric, benzene or p-toluene sulfonic acid, or with diazo compounds, or converted into their halides by treatment with thionyl halides or phosphorus halides or oxyhalides. Resulting esters may be hydrolyzed or transesterified in the presence of acidic or alkaline agents, e.g. mineral or complex heavy metal acids or alkali metal carbonates or alcoholates, or treated with ammonia or corresponding amines. Resulting acid halides may be treated with alcohols, ammonia or amines and resulting metal or ammonium salts with aliphatic or araliphatic halides or chlorosulfites, thionyl halides, phosphorus oxide, sulfide, halides or oxyhalides or other acyl halides in order to obtain the corresponding esters, halides, anhydrides, amides, thioamides or the nitrile respectively. Resulting amides or thioamides (Willgerodt) can be hydrolyzed under acidic or alkaline conditions, e.g. with the use of aqueous mineral and/or carboxylic acids or alkali metal hydroxides, also alcoholized, transaminated or desulfurized, e.g. with the use of mercuric oxide or alkyl halides followed by hydrolysis. Resulting nitriles likewise can be hydrolyzed or alcoholized, e.g. with the use of concentrated aqueous or alcoholic acids or alkalis or alkaline hydrogen peroxide. A resulting ester, salt or nitrile, containing in α-position at least one hydrogen atom, can be metallized therein, e.g. with the use of alkali metal organic compounds, such as phenyl lithium, triphenylmethyl sodium or sodium amides or alcoholates, and thereupon reacted with reactive esters of $R_1$-OH and/or $R_2$-OH. Resulting compounds containing a primary or secondary amino group, can be reacted with a reactive ester of a corresponding alcohol, for example, such mentioned above, or can be acylated, for example, with a reactive functional derivative of a corresponding acid, such as a halide or anhydride thereof, or resulting acyl derivatives may be split, for example, with the use of acidic or alkaline hydrolyzing agents, or phthaloyl compounds by hydrazinolysis. Resulting unsaturated compounds can be hydrogenated by the controlled uptake of catalytically activated hydrogen, in order to eliminate double bonds, e.g. in the $R_2$-group and/or ester moiety. Resulting compounds may also be halogenated or nitrated in the Ph- moiety, e.g. with the use of nitric acid and/or nitrates under acidic conditions, or in phenolic compounds the hydroxy or mercapto group etherified, e.g. with the use of the corresponding alkali metal phenolates and lower alkyl halides or sulfonates, or resulting phenol ethers hydrolyzed, e.g. with hydrobromic and acetic acid or pyridine hydrochloride.

A resulting acid can be converted into its salts according to conventional methods, for example, by reacting it with an about stoichiometric amount of a suitable salt-forming reagent, such as ammonia, an amine or an alkali or alkaline earth metal hydroxide, carbonate or hydrogen carbonate. A salt of this type can be reconverted into the free acid by treatment with an acid, e.g. hydrochloric, sulfuric or acetic acid until the proper pH has been reached. A resulting compound can be converted into a corresponding acid addition salt, for example by reacting it with an inorganic or organic acid, such as a therapeutically useful acid, or with a corresponding anion exchange preparation, and isolating the desired salt. An acid addition salt may be converted into the free compound by treatment with a base, e.g. a metal hydroxide, ammonia or a hydroxyl ion exchange preparation. Therapeutically useful acids are, for example, inorganic acids, e.g. hydrochloric, hydrobromic, sulfuric, phosphoric, nitric, or perchloric acid, or organic acids, e.g. carboxylic or sulfonic acids, such as formic, acetic, propionic, succinic, glycollic, lactic, malic, tartaric, citric, ascorbic, maleic, hydroxymaleic, pyroracemic, phenylacetic, benzoic, 4-aminobenzoic, anthranilic, 4-hydroxybenzoic, salicylic, aminosalicylic, embonic, nicotinic, methanesulfonic, ethanesulfonic, hydroxyethanesulfonic, ethylenesulfonic, benzenesulfonic, halogenbenzenesulfonic, toluenesulfonic, naphthalenesulfonic and sulfanilic acid; methionine, tryptophan, lysine or arginine.

These or other salts, for example, the picrates, can also be used for purification of the bases obtained; the bases are converted into salts, the salts are separated and the bases are liberated from the salts. In view of the close relationship between the free compounds and the compounds in the form of their salts, whenever a compound is referred to in this context, a corresponding salt is also intended, provided such is possible or appropriate under the circumstances.

Resulting mixtures of isomers can be separated into the single isomers by methods in themselves known, e.g. by fractional distillation, crystallization and/or chromatography. Racemic products can likewise be resolved into the optical antipodes, for example by separation of diastereomeric salts thereof, e.g. by the fractional crystallization of d- or l-tartrates or d-α-(phenyl or l-naphthyl)-ethylamine or l-cinchonidine salts.

The above reactions are carried out according to standard methods, in the presence or absence of diluents, preferably such as are inert to the reagents and are solvents thereof, of catalysts, condensing or neutralizing agents and/or inert atmospheres, at low temperatures, room temperature or elevated temperatures, at atmospheric or superatmospheric pressure.

The invention also comprises any modification of the above process, wherein a compound resulting as an intermediate at any stage thereof, is used as starting material and the remaining steps are carried out or the process is discontinued at any stage thereof, or in which the starting material is formed under the reaction conditions or is used in the form of its salts or reactive derivatives. Those starting materials are preferably used, which lead to those compounds of the invention, which are indicated above as the preferred embodiments of the invention.

The starting material used is known or, if new, may be prepared according to methods known per se. For example, the starting material mentioned under item (a) is prepared from compounds of the formula

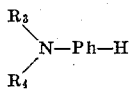

according to Friedel-Crafts, e.g. with the use of $R_2$-COCl, hydrogen chloride and formaldehyde or phosgene and aluminum chloride. The resulting ketones or acyl halides are either used as such in the above-mentioned Willgerodt-Kindler or Arndt-Eistert reactions, or the ketones are reduced to the corresponding alcohols, advantageously with the use of an $R_1$-Grignard compound or sodium borohydride, or a

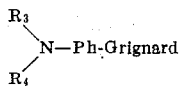

compound reacted with the aldehyde or ketone $R_1$-CO-$R_2$. The resulting alcohols can be reactively esterified, e.g. with thionyl or sulfonyl halides, or etherified, e.g. with methanolic sulfuric acid and, if desired, the resulting esters converted into the ethers, e.g. with the use of alkali metal lower alkoxides, and the ethers or esters metallized, e.g. with magnesium, zinc, mercury and/or alkali metals and, if desired, Grignard compounds, in order to obtain the starting material containing Y. That, containing Z can be obtained by reacting the above metal derivatives with formyl or oxalyl halides, by the reaction of said ketones

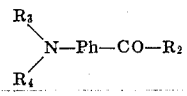

with $R_1$-halomagnesium compounds followed by dehydration of the resulting alcohols, for example, with sulfuric or acetic acid and/or acetanhydride, and boranation or hydration of any resulting methylidene compound, e.g. its reaction with boranes or diluted mineral acids and, if desired, traces of peroxides, e.g. benzoyl peroxide, in order to obtain the hydroxy- or borylmethyl compounds. Those, in which Z is formyl, can be obtained from said ketones

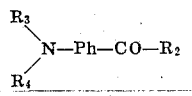

by reaction with dimethylsulfoniummethylide or dimethyl-oxysulfoniummethylide (generated from the corresponding trimethylsulfonium salts) and rearranging the resulting ethyleneoxides to the corresponding aldehydes by the action of Lewis acids, e.g. p-toluene sulfonic acid or boron trifluoride. Said aldehydes can also be obtained according to the Darzens condensation by reacting the above ketones with α-halo-alkanoic or -alkenoic acid esters in the presence of alcoholates, e.g. potassium tert. butoxide, saponifying the glycidic esters formed and rearranging and decarboxylating them, advantageously in acidic media, e.g. sulfuric acid. Finally, the starting material containing the free or functionally converted

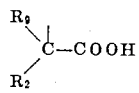

or

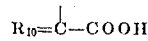

group can be obtained according to Friedel-Crafts with the use of

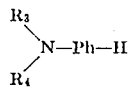

and oxalyl halides and reduction of the resulting phenylglyoxylic acid esters with $R_2$-Grignard compounds, if desired, followed by dehydration, or according to the Ando synthesis by the addition of mesoxalates to the tert. anilines in the presence of stannic chloride. The resulting adduct can either by hydrogenated, the malonate formed metallized and reacted with a reactive ester of $R_2$-OH or saponified and decarboxylated. The corresponding nitriles can also be obtained from the Friedel-Crafts ketones according to the cyanohydrin synthesis and, if desired, hydrolyzing and/or dehydrating the resulting cyanohydrins. The starting materials mentioned under item (b) are prepared analogous to reaction (a). if desired followed by acylation, e.g. with the use of the halides or anhydrides of corresponding acids, e.g. lower alkanoic, hydroxy-alkanoic, alkoxyalkanoic, aminoalkanoic, cycloaliphatic or aralkanoic acids, e.g. acetic, glycolic, cyclopentylcarboxylic or benzoic acid chloride. The intermediates so obtained, can also be converted into each other, as shown for the final products.

The pharmaceutically active compounds of the invention can be used, for example, for the manufacture of pharmaceutical compositions containing them in conjunction or admixture with inorganic or organic, solid or liquid pharmaceutical excipients, suitable for enteral or parenteral administration. Suitable excipients are substances that do not react with the compounds of the invention, for example, water, gelatine, sugars, e.g. lactose, glucose or sucrose, starches, e.g. corn starch or arrowroot, stearic acid or salts thereof, e.g. magnesium or calcium stearate, talc, vegetable fats or oils, gums, alginic acid, benzyl alcohols, glycols, and other known excipients. The compositions may be, for example, in solid form as tablets, dragees or capsules, or in liquid form as solutions, suspensions or emulsions. They may be sterilized and/or contain adjuvants, such as preserving, stabilizing, wetting or emulsifying agents, solution promoters, salts for regulating the osmotic pressure and/or buffers. They may further contain other therapeutically valuable substances. Said pharmaceutical compositions are prepared by conventional methods and contain about 0.1 to 75 percent, more particularly 1 to 50 percent, of the active ingredient. They are also included within the scope of the present invention.

The following examples are intended to illustrate the invention and are not to be construed as being limitations thereon. Temperatures are given in degrees Centigrade, and all parts wherever given are parts by weight.

EXAMPLE 1

The mixture of 5.65 g 4-N-methyl-N-phenylamino-acetophenone, 15 ml morpholine and 2 g sulfur is refluxed for 12 hours and evaporated in vacuo. The residue is taken up in ethanol, the solution filtered and evaporated, to yield the 4-N-methyl-N-phenylaminophenyl-thioacetmorpholide of the formula

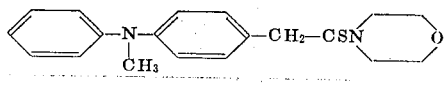

showing in the U. V. spectrum a $\lambda_{max} = 246$ (9,490) and 294 (12,780) and $\lambda_{min} = 228$ (6,220) and 262 (5,460) in methanol.

EXAMPLE 2

The mixture of 5 g 4-N-methyl-N-phenylaminophenyl-thioacetomorpholide and 50 ml 25 percent potassium hydroxide in ethylene glycolwater (1:2) is heated on the steam cone overnight. It is evaporated in vacuo, the residue taken up in water, the mixture washed with diethyl ether, the aqueous phase acidified with concentrated hydrochloric acid and extracted with diethyl ether. The extract is washed with 10 percent aqueous potassium bicarbonate, the aqueous solution separated, again acidified with concentrated hydrochloric acid and extracted with diethyl ether. The extract is washed with water, dried, evaporated and the residue recrystallized from diethyl ether-petroleum ether, to yield the 4-N-methyl-N-phenylaminophenylacetic acid of the formula

melting at 93°–95°.

EXAMPLE 3

To the solution of 5.6 g 4-N-methyl-N-phenylaminophenylacetic acid in 100 ml diethyl ether, a saturated solution of diazomethane in diethyl ether is added dropwise while stirring, until the yellow color persists. The mixture is allowed to stand at room temperature for 2 hours, washed with 5 percent aqueous sodium bicarbonate, dried, filtered, evaporated, the residue distilled and the fraction boiling at 165°–175°/0.1 mm Hg collected, to yield the methyl 4-N-methyl-N-phenylaminophenyl-acetate of the formula

EXAMPLE 4

The solution of 3.9 g methyl 4-N-methyl-N-phenylaminophenyl-acetate in 18 ml diethyl ether is added dropwise to the gray mixture prepared from 0.58 g sodium, 100 ml liquid ammonia and 2 crystals ferric nitrate nonahydrate while stirring, and stirring is continued for 1 hour. Hereupon the solution of 6.8 g methyl iodide in 10 ml diethyl ether is added dropwise and stirring is continued for 1 hour. The mixture is allowed to evaporate overnight, the residue taken up in water and the mixture extracted with methylene chloride. The extract is washed with brine, dried and evaporated, to yield the methyl α-(4-N-methyl-N-phenylaminophenyl)-propionate of the formula

showing in the U. V. spectrum a $\lambda_{max} = 247$ (8,680) and 292 (15,030) and a $\lambda_{min} = 231$ (6,290) and 261 (5,950) in methanol.

EXAMPLE 5

The solution of 1.3 g methyl α-(4-N-methyl-N-phenylaminophenyl)-propionate in the minimum amount of ethanol is added hydroxide, the 25 ml 2N aqueous potassium hydroxide, the mixture heated at the steam bath for about 3 hours and slowly evaporated. The residue is taken up in water, the solution acidified with concentrated hydrochloric acid, the mixture extracted with diethyl ether, the ethereal layer washed with water and extracted with 10 percent aqueous potassium bicarbonate. The aqueous solution is acidified with 3N hydrochloric acid, extracted with diethyl ether, the extract dried, filtered and evaporated. The residue is taken up in the minimum amount of methylene chloride, the solution poured on a column of 20 g silica gel, which is eluted with 800 ml methylene chloride. The eluate is evaporated and the residue recrystallized from diethyl ether-petroleum ether, to yield the α-(4-N-methyl-N-phenylaminophenyl)-propionic acid of the formula

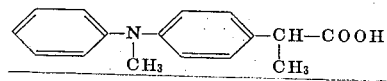

melting at 81°–83°.

EXAMPLE 6

Preparation of 10,000 tablets each containing 50.0 mg of the active ingredient:

Formula:

| | |
|---|---|
| 4-N-methyl-N-phenylamino-phenyl-acetic acid | 500.00 g |
| Lactose | 1,706.00 g |
| Corn Starch | 90.00 g |
| Polyethylene glycol 6,000 | 90.00 g |
| Talcum powder | 90.00 g |
| Magnesium stearate | 24.00 g |
| Purified water | q.s. |

Procedure:

All the powders are passed through a screen with openings of 0.6 mm. Then the drug substance, lactose, talcum, magnesium stearate and half of the starch are mixed in a suitable mixer. The other half of the starch is suspended in 45 ml water and the suspension added to the boiling solution of the polyethylene glycol in 180 ml water. The paste formed is added to the powders which are granulated, if necessary, with an additional amount of water. The granulate is dried overnight at 35°, broken on a screen with 1.2 mm openings and compressed into tablets using concave punches with 7.1 mm diameter, uppers bisected.

EXAMPLE 7

Preparation of 10,000 tablets each containing 10.0 mg of the active ingredient:

Formula:

| | |
|---|---|
| α-(4-N-methyl-N-phenylaminophenyl)-propionic acid | 100.00 g |
| Lactose | 1,157.00 g |
| Corn Starch | 75.00 g |
| Polyethylene glycol 6,000 | 75.00 g |
| Talcum powder | 75.00 g |
| Magnesium stearate | 18.00 g |
| Purified water | q.s. |

Procedure:

All the powders are passed through a screen with openings of 0.6 mm. Then the drug substance, lactose, talcum, magnesium stearate and half of the starch are mixed in a suitable mixer. The other half of the starch is suspended in 40 ml water and the suspension added to the boiling solution of the polyethylene glycol in 150 ml water. The paste formed is added to the powders which are granulated, if necessary, with an additional amount of water. The granulate is dried overnight at 35°, broken on a screen with 1.2 mm openings and compressed into tablets using concave punches with 6.4 mm diameter, uppers bisected.

EXAMPLE 8

According to the method described in the previous examples, the following compounds are prepared from equivalent amounts of the corresponding starting materials:

1. α-cyclopentyl-α-[4-N-methyl-N-(4-methoxyphenylamino)-phenyl]-acetic acid
2. α-(3-chloro-4-N-methyl-N-phenylaminophenyl)-propionic acid
3. 4-sec. butyl-3-N-(2-hydroxyethyl)-N-phenylaminophenyl-acetic acid
4. 4-N-(3-dimethylaminopropyl)-N-(4-chlorophenyl)-aminophenyl-acetic acid
5. β-cyclopropyl-α-(4-N-methyl-N-phenylaminophenyl)-propionic acid
6. 4-N-(2-furyl)-N-(2-methoxyethyl)-aminophenyl-acetic acid
7. 3-N-cyclohexyl-N-phenylamino-4-methoxyphenyl-acetic acid
8. 3-chloro-4-N-(2-hydroxyethyl)-N-4-anisylaminophenyl-acetic acid
9. α-(3-amino-4-N-methyl-N-phenylaminophenyl)-propionic acid
10. α-(3-acetylamino-4-N-methyl-N-3-tolylaminophenyl)-propionic acid
11. 4-cyano-3-N-methyl-N-phenylaminophenyl-acetic acid
12. 4-carboxy-3-N-methyl-N-phenylaminophenyl-acetic acid
13. 3-sulfamoyl-4-N-(2-hydroxyethyl)-N-phenylaminophenyl-acetic acid
14. 4-N-(2-methoxyethyl)-N-(4-chlorophenyl)-aminophenyl-acetic acid.

We claim:

1. A pharmaceutical composition comprising an antiinflammatory effective amount of a compound of the formula

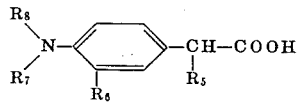

in which $R_5$ is cyclopropyl, $R_6$ is hydrogen or chloro, $R_7$ is methyl or ethyl and $R_8$ is phenyl, tolyl, anisyl or chlorophenyl, or the methyl or ethyl ester, the ammonium salt, an alkali metal salt or a therapeutically useful acid addition salt thereof, together with a pharmaceutical excipient.

2. A composition as claimed in claim 1, in which formula of the effective compound $R_5$ is cyclopropyl, $R_6$ is hydrogen or chloro, $R_7$ is methyl or ethyl and $R_8$ is phenyl, tolyl, anisyl or chlorophenyl.

* * * * *